C. P. GOSS.
Potato-Digger.
No. 35,371. Patented May 27, 1862.
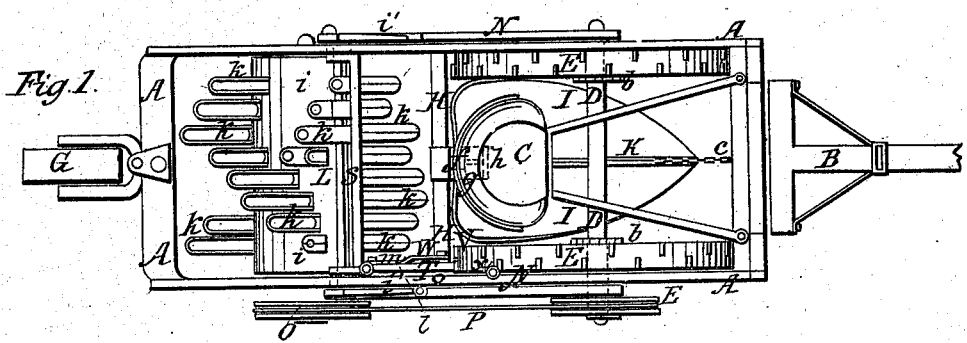
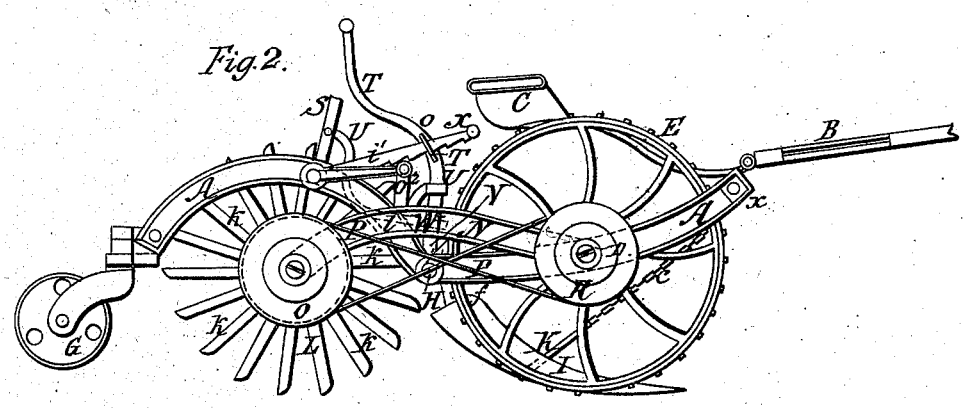
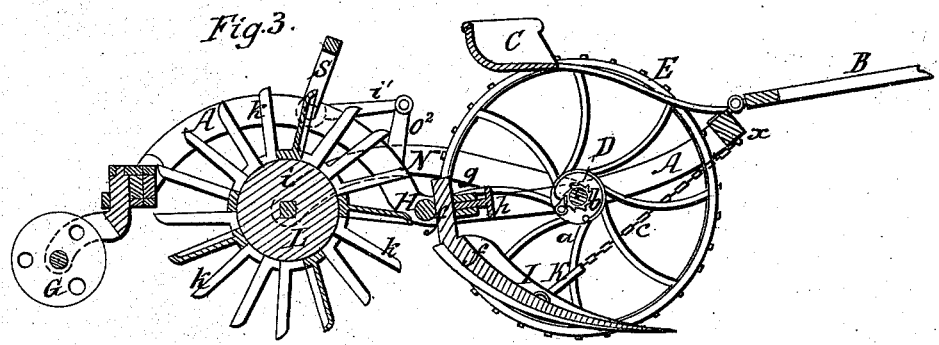
Witnesses:
A. G. Chadwick.
P. M. Chadwick.
Inventor:
Charles P. Goss.

UNITED STATES PATENT OFFICE.

CHARLES P. GOSS, OF ST. JOHNSBURY, VERMONT.

IMPROVED CULTIVATOR AND POTATO-DIGGER.

Specification forming part of Letters Patent No. 35,371, dated May 27, 1862.

*To all whom it may concern:*

Be it known that I, CHARLES P. GOSS, a citizen of the United States of America, and a resident of St. Johnsbury, in the county of Caledonia and State of Vermont, have invented a new or Improved Cultivator and Potato-Digger; and I do hereby declare the same to be fully described in the following specification and represented in the accompanying drawings, of which—

Figure 1 is a top view, Fig. 2 a side elevation, and Fig. 3 a longitudinal section, of it.

The nature of my invention consists in the combination and arrangement of a scoop and a rotary breaker with a set of driving-wheels and machinery for operating the sod-breaker by the rotation of either or both of such wheels; also, in the combination of the scoop and rotary breaker with separate frames extending from the wheel-axle and arranged with respect to one another, and provided with adjusting mechanism, substantially as hereinafter specified; also, in certain mechanism for simultaneously raising or turning the scoop and breaker and adjusting the scoop; also, in an adjustable knife and a supporting-chain or its equivalent combined with the scoop and its frame, such being for the purpose of cutting vines which may pass over the surface of the scoop while the machine is at work.

The purpose of my invention is to dig into soil containing potatoes and raise it and them upward, and to break up the soil so as to separate the potatoes from it, my said invention under other circumstances being capable of being used as a cultivator for preparing ground for farming purposes.

In the drawings, A represents the main frame of the machine as provided not only with a tongue, B, for the attachment of draft-animals, but with a seat, C, for the support of the driver. This frame is upheld by an axle, D, which extends across it and projects beyond it in opposite directions. Two supporting and driving wheels, E E, are arranged on such axle and so as to be capable of freely revolving upon it, the hub of each wheel being furnished with a small spring-pawl, $a$, to act with one of two ratchets, $b$ $b$, affixed on the axle, the whole being so as not only to cause the axle to be revolved by and with the wheels when the machine is being drawn forward on the ground, but to enable the wheels to revolve without revolving the axle when the machine is moved backward. The rear end of the frame A should be provided with a swiveling wheel or caster, G, for supporting it at such times as the machine may be backed or when it may be desirable to prevent the teeth of the rotary breaker from entering the ground.

Between the driving-wheels and extending down from a socketed shaft, H, which is carried across and secured to and so as to be able to turn on the frame A, is a large scoop or shovel, I, to the middle of which a knife or sod-cutter, K, is hinged, the said knife having a chain, $c$, projecting from it to the front end of the frame A. The said scoop has the form of a pointed spade, and is curved longitudinally, so as to cause the earth and potatoes, when taken up by the scoop, to be forced upward and over the heel or rear end of the scoop, and to fall in close sheets over such rear ends, and so as to enable the teeth of the breaker L to strike into and break up such earth and separate the potatoes from it. The knife K is for separating the earth or cutting the vines preparatory to the passage of such against the shank $f$ of the scoop, such shank being made to project through the socket-head $g$ of the shaft H and to be held in place by a set-screw, $h$, screwed into the said head and against the shank. By means of the said shank, socket, and screw the scoop or shovel may be adjusted in position either higher or lower, as circumstances may require. While the chain, some link of which is to be hooked into a hook, $x$, serves to support the knife when adjusted in any position, it will also allow of its being adjusted at any desirable declination relatively to the upper surface of the scoop.

The breaker is composed of a drum, $i$, and a series of wires or teeth, $k$ $k$ $k$, fastened to and extending radially from the curved surface of such drum, the same being as shown in the drawings. This breaker is mounted in and so as to be capable of being revolved within an auxiliary frame or two levers or bars, N N, each of which, near one end, turns freely on the driving shaft or axle B, while at its other end it supports the shaft of the breaker. A pulley, O, is affixed to such breaker-shaft, and has a crossed band or chain, P, working around its grooved periphery and that of another pulley, R, affixed on the axle D. Furthermore, there is a cranked lever, S, extending across the frame A and over the breaker. From each wrist or journal of this lever one of two arms, $i'\ i'$, projects, as shown in the drawings, and has one of the two bars N N suspended from its outer end by means of a link or connection-bar, $o^2$, which is jointed to the lower arm and such bar N. Furthermore, the lever S is connected with a hand-lever, T, by a crooked connection-bar, U, jointed to both of such parts S T. The hand-lever turns on the scoop-shaft H, from which, near to the lever, an arm, V, projects, and is jointed to a gage-bar, W. This bar W lies against the curved bar U, and has a slot, $l$, through which a set-screw, $m$, passes and screws into the bar U. By means of the gage-bar W and its set-screw operating with the arm V and the crooked bar U I can gage or modify the dip of the scoop and fix such scoop in position. A rack-bar, X, is jointed to the inner side of one of the bars N N, and extends through a staple, $o$, applied to the side of the hand-lever T, the said rack-bar being provided with teeth or notches to catch on or against the staple. By pressing backward the lever T I raise both the scoop and the breaker off the ground, so as to enable the whole machine to be run on the same without digging into or scraping it up, the rack-bar X serving to hold the lever back. By lifting the rack-bar so as to disengage it from the said lever T the scoop and breaker will be free to drop toward the ground.

In drawing the machine over the ground in order to dig potatoes therefrom, the point of the scoop will enter the earth and cause the scoop to penetrate the same far enough to go below the potatoes. The resistance of the scoop to the draft will cause the breaker and rear part of the machine to be lifted high above the ground, in which case the weight and leverage of the rear part of the machine will contribute to loosen the soil under which the scoop may be in operation. The earth, while the machine is being drawn forward, will pass or be forced up the scoop, and will be directed by it against and on the teeth of the breaker, which, revolving, will break up the sheet or sheets of earth and separate the potatoes therefrom, they being laid in rows in such manner on the surface of the ground as to be easily seen in order to be either picked or raked up.

I claim—

1. The combination and arrangement of the single scoop and the rotary breaker, the driving-wheels, their shaft, and machinery for rotating the breaker, the whole being substantially as specified.

2. The combination and arrangement of the scoop and rotary breaker with a separate frame, A, and two bars, N N, extending from the axle of the driving-wheels and arranged with respect to one another, and provided with elevating and depressing mechanism, as specified.

3. The combination of mechanism for simultaneously elevating and depressing the scoop and the breaker, and adjusting the point of the breaker relatively to the ground, the same consisting of the cranked lever S, the hand-lever T, the crooked connection-bar U, the arm V and its slotted bar W, and set-screw $m$, the whole being applied to the main frame A and the auxiliary bars N N of the machine and to the scoop-shaft, substantially as and so as to operate as described.

4. I do not claim a stationary cutter or knife combined with a plow; but I claim not only the application of the knife or cutter to the scoop in such manner that the angle of inclination of the said knife may be varied relatively to the scoop, but the application of a supporting-chain or its equivalent to the knife and the main frame of the machine, and to support the upper end of the knife, as set forth.

CHARLES P. GOSS.

Witnesses:
CHAS. K. CHADWICK,
MATTIE CHADWICK.